United States Patent [19]
Quigley

[11] Patent Number: 5,717,555
[45] Date of Patent: Feb. 10, 1998

[54] CLOCK STYLE COUNTER ATTACHMENT

[76] Inventor: Edwin C. Quigley, 31 Egypt Rd., Norristown, Pa. 19403-3001

[21] Appl. No.: 783,338

[22] Filed: Jan. 16, 1997

[51] Int. Cl.$^6$ .................................................. G11B 27/13
[52] U.S. Cl. .................................................. 360/137
[58] Field of Search ........................... 360/137, 72.2; 242/357; 377/18

[56] References Cited

U.S. PATENT DOCUMENTS

| | | | |
|---|---|---|---|
| 2,757,456 | 8/1956 | Handa | 360/137 |
| 2,779,826 | 1/1957 | Scott | 360/137 |
| 3,770,281 | 11/1973 | Walburn | 360/137 |
| 3,946,437 | 3/1976 | Ono | 360/137 |
| 3,995,319 | 11/1976 | Harris | 360/137 |
| 4,135,216 | 1/1979 | Laufer | 360/137 |
| 4,185,306 | 1/1980 | Dudley | 360/137 |
| 4,217,614 | 8/1980 | Balson | 360/132 |
| 4,412,663 | 11/1983 | Martinesco | 242/200 |
| 4,575,778 | 3/1986 | Vogelgesang | 360/137 |
| 4,586,101 | 4/1986 | Vogelgesang | 360/137 |
| 5,130,879 | 7/1992 | Weiley | 360/132 |

*Primary Examiner*—Robert S. Tupper
*Assistant Examiner*—Kevin M. Watkins

[57] ABSTRACT

A new Clock Style Counter Attachment for providing a playing time readout of magnetic tape cassettes using an analog clock timer facing. The inventive device includes an add on gear disposed around a rotating drive shaft of a cassette playing device, a transmission drive shaft having a transmission gear at one end and a drive slot gear at its other end, and a timer having a timing gear system and a time display mechanism. The transmission gear operatively engaging the add on gear to rotate the transmission drive, and the drive slot gear operatively engaging a timing gear system. The timing gear system is operatively connected to the time display mechanism which displays the length of time a magnetic tape cassette has played in the magnetic tape cassette playing device.

8 Claims, 3 Drawing Sheets

CLOCK STYLE COUNTER ATTACHMENT

BACKGROUND OF THE INVENTION

1. Field of the Invention

The present invention relates to magnetic tape cassette player counter devices and more particularly pertains to a new Clock Style Counter Attachment for providing a playing time readout of magnetic tape cassettes using an analog clock facing.

2. Description of the Prior Art

The use of magnetic tape cassette player counter devices is known in the prior art. More specifically, magnetic tape cassette player counter devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art magnetic tape cassette player counter devices include U.S. Pat. No. 4,217,614; U.S. Pat. No. 4,575,778; U.S. Pat. No. 4,412,663; U.S. Pat. No. 4,586,101; U.S. Pat. No. 3,995,319.

While these devices fulfill their respective, particular objectives and requirements, the aforementioned patents do not disclose a new Clock Style Counter Attachment. The inventive device includes an add on gear disposed around a rotating drive shaft of a cassette playing device, a transmission drive shaft having a transmission gear at one end and a drive slot gear at its other end, and a timer having a timing gear system and a time display mechanism. The transmission gear operatively engaging the add on gear to rotate the transmission drive, and the drive slot gear operatively engaging a timing gear system. The timing gear system is operatively connected to the time display mechanism which displays the length of time a magnetic tape cassette has played in the magnetic tape cassette playing device.

In these respects, the Clock Style Counter Attachment according to the present invention substantially departs from the conventional concepts and designs of the prior art, and in so doing provides an apparatus primarily developed for the purpose of providing a playing time readout of magnetic tape cassettes using an analog clock facing.

SUMMARY OF THE INVENTION

In view of the foregoing disadvantages inherent in the known types of magnetic tape cassette player counter devices now present in the prior art, the present invention provides a new Clock Style Counter Attachment construction wherein the same can be utilized for providing a playing time readout of magnetic tape cassettes using an analog clock facing.

The general purpose of the present invention, which will be described subsequently in greater detail, is to provide a new Clock Style Counter Attachment apparatus and method which has many of the advantages of the magnetic tape cassette player counter devices mentioned heretofore and many novel features that result in a new Clock Style Counter Attachment which is not anticipated, rendered obvious, suggested, or even implied by any of the prior art magnetic tape cassette player counter devices, either alone or in any combination thereof.

To attain this, the present invention generally comprises an add on gear disposed around a rotating drive shaft of a cassette playing device, a transmission drive shaft having a transmission gear at one end and a drive slot gear at its other end, and a timer having a timing gear system and a time display mechanism. The transmission gear operatively engaging the add on gear to rotate the transmission drive, and the drive slot gear operatively engaging a timing gear system. The timing gear system is operatively connected to the time display mechanism which displays the length of time a magnetic tape cassette has played in the magnetic tape cassette playing device.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Clock Style Counter Attachment apparatus and method which has many of the advantages of the magnetic tape cassette player counter devices mentioned heretofore and many novel features that result in a new Clock Style Counter Attachment which is not anticipated, rendered obvious, suggested, or even implied by any of the prior art magnetic tape cassette player counter devices, either alone or in any combination thereof.

It is another object of the present invention to provide a new Clock Style Counter Attachment which may be easily and efficiently manufactured and marketed.

It is a further object of the present invention to provide a new Clock Style Counter Attachment which is of a durable and reliable construction.

An even further object of the present invention is to provide a new Clock Style Counter Attachment which is susceptible of a low cost of manufacture with regard to both materials and labor, and which accordingly is then susceptible of low prices of sale to the consuming public, thereby making such Clock Style Counter Attachment economically available to the buying public.

Still yet another object of the present invention is to provide a new Clock Style Counter Attachment which provides in the apparatuses and methods of the prior art some of the advantages thereof, while simultaneously overcoming some of the disadvantages normally associated therewith.

Still another object of the present invention is to provide a new Clock Style Counter Attachment for providing a playing time readout of magnetic tape cassettes using an analog clock facing.

Yet another object of the present invention is to provide a new Clock Style Counter Attachment which includes an add on gear disposed around a rotating drive shaft of a cassette playing device, a transmission drive shaft having a transmission gear at one end and a drive slot gear at its other end, and a timer having a timing gear system and a time display mechanism. The transmission gear operatively engaging the add on gear to rotate the transmission drive, and the drive slot gear operatively engaging a timing gear system. The timing gear system is operatively connected to the time display mechanism which displays the length of time a magnetic tape cassette has played in the magnetic tape cassette playing device.

Still yet another object of the present invention is to provide a new Clock Style Counter Attachment that allows a user to easily interpret the chronographic display at any reasonable viewing distance.

Even still another object of the present invention is to provide a new Clock Style Counter Attachment that provides way of determining the length of time a magnetic tape cassette has played in a manner that the user can easily relate to.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
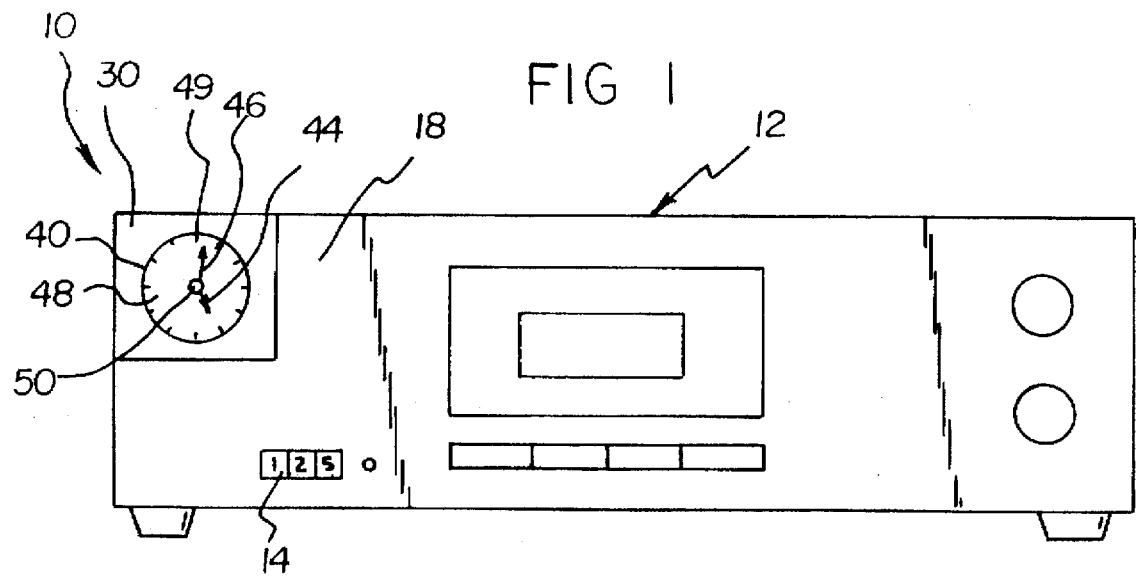
FIG. 1 is a front side view of a new Clock Style Counter Attachment showing the timer and its time display mechanism mounted to a cassette tape playing device having an incremental tape position counter.
Figure 2:
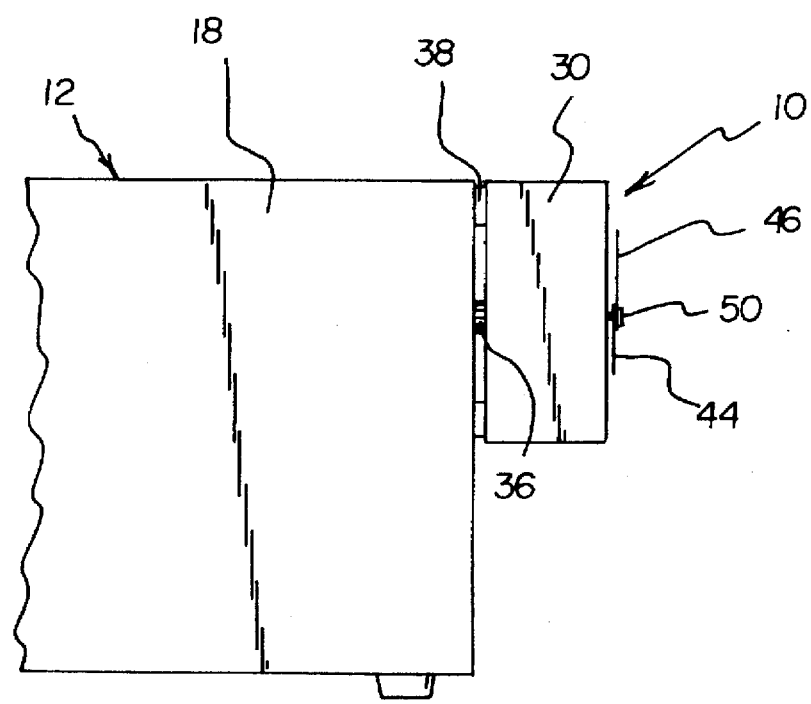
FIG. 2 is a side view of a new Clock Style Counter Attachment showing the timer, its timing gear system and its time display mechanism mounted to a cassette tape playing device.
Figure 3:
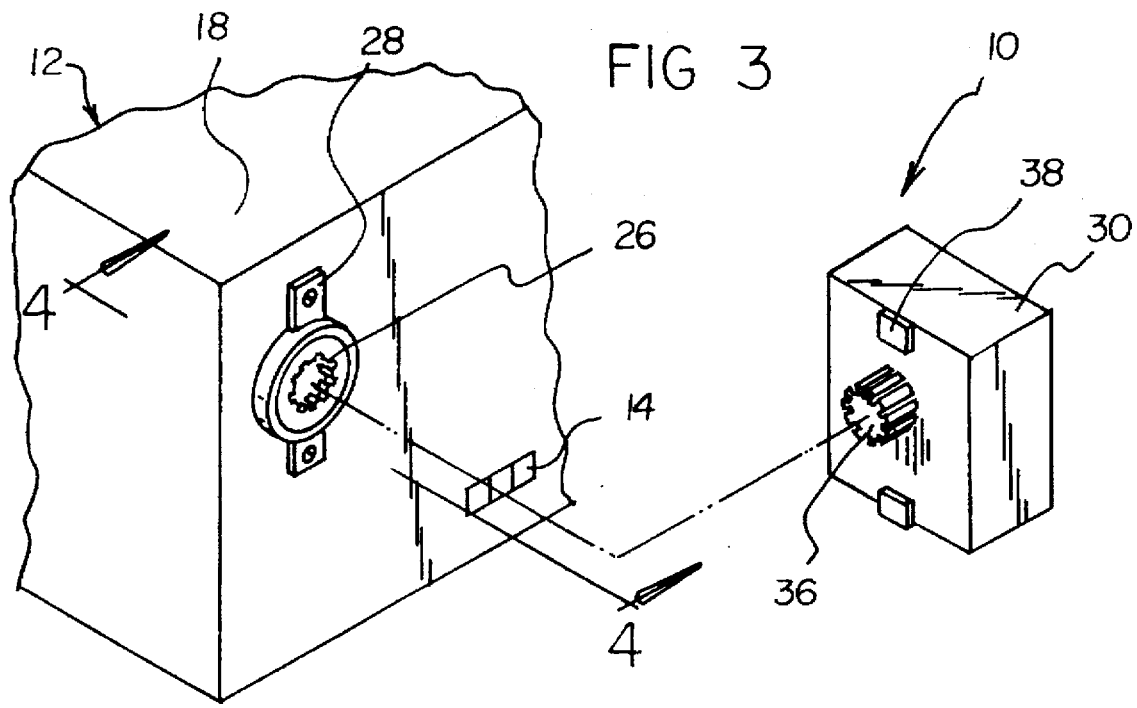
FIG. 3 is an exploded isometric illustration of the present invention showing the timing gear system and the drive slot gear mounted on the cassette playing device.
Figure 4:
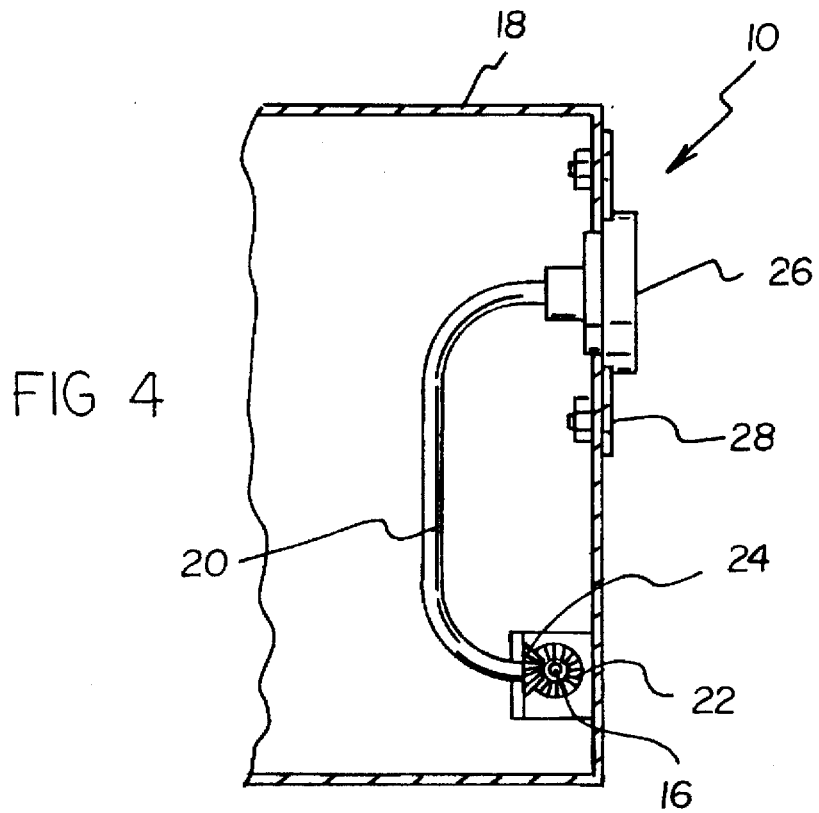
FIG. 4 is a partial cross sectional view of the invention taken along line 4—4 of FIG. 3 showing the transmission drive shaft, the add on gear and the drive slot mounting bracket.
Figure 5:
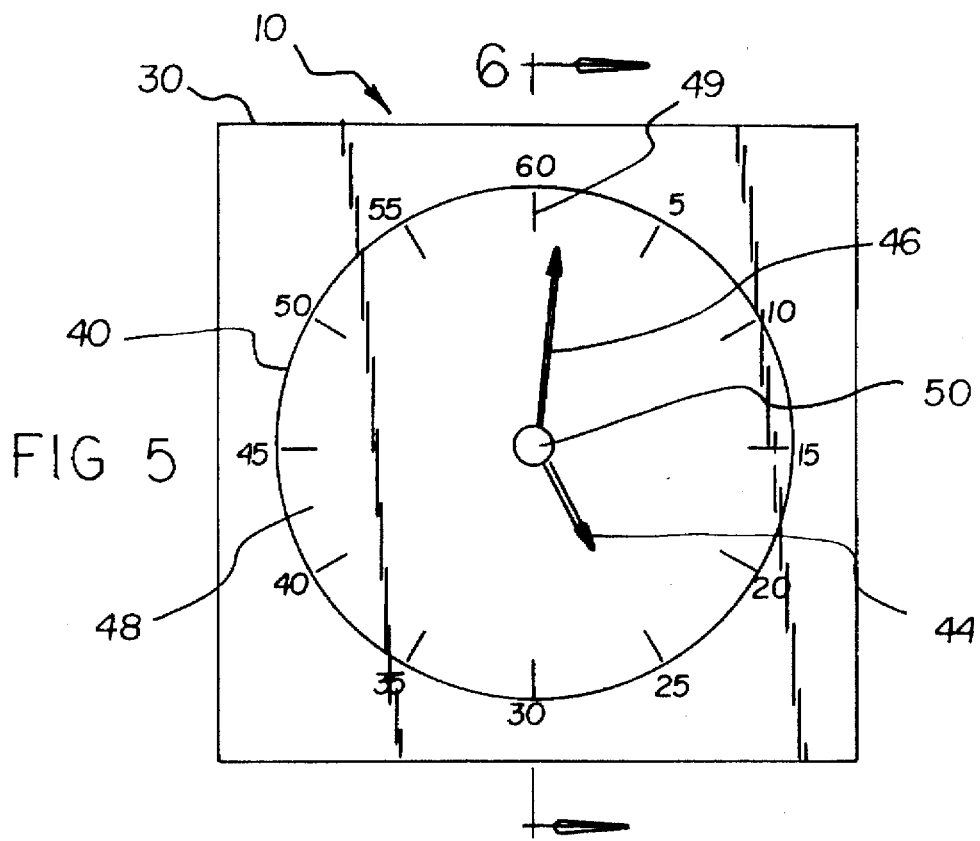
FIG. 5 is a front side view taken showing the time display mechanism.
Figure 6:
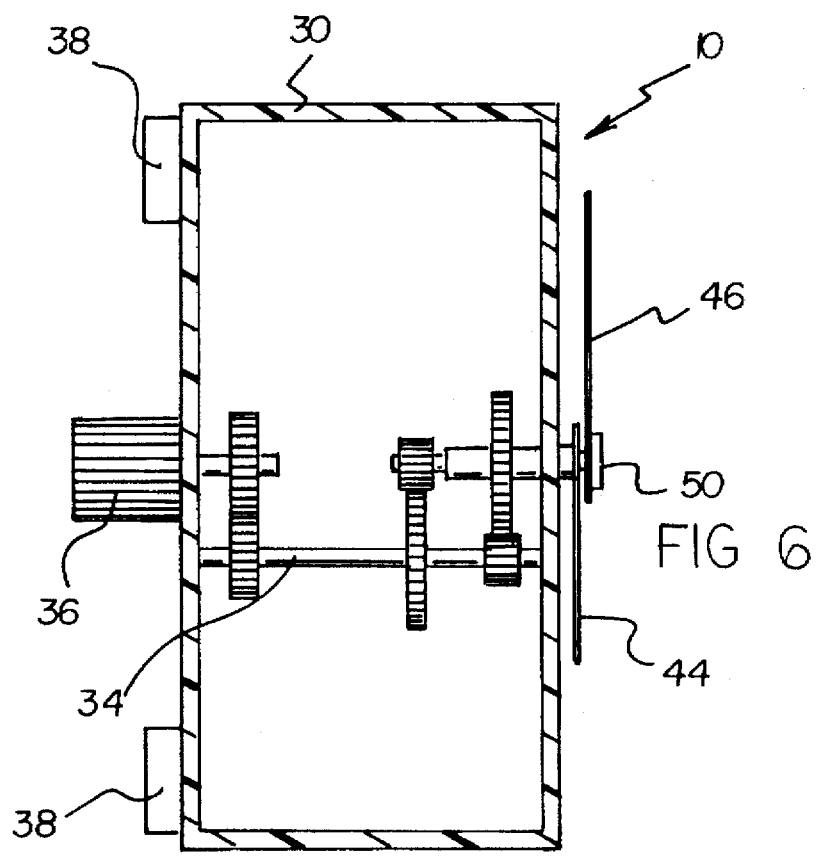
FIG. 6 is a cross sectional view taken along line 6—6 of FIG. 5 showing the timer, the timing gear system and a set up of the internal hand gears.

With reference now to the drawings, and in particular to FIGS. 1 through 6 thereof, a new Clock Style Counter Attachment embodying the principles and concepts of the present invention and generally designated by the reference numeral 10 will be described.

More specifically, it will be noted that the Clock Style Counter Attachment 10 comprises an add on gear 22, a transmission drive shaft 20, a drive slot gear 26, and a timer 30 having a time display mechanism 32.

As best illustrated in FIGS. 1 through 6, it can be shown that the Clock Style Counter Attachment 10 is for a magnetic tape cassette playing and recording device (hereafter a "magnetic tape cassette playing device") 12 having an exterior housing 18 and having an incremental tape position counter 14 driven by a rotating counter drive shaft 16 from the magnetic tape cassette playing device 12 a magnetic tape cassette.

First, an add on gear 22 is disposed around the rotating counter drive shaft 16. The add on gear 22 engages a transmission gear 24 attached to one end of a transmission drive shaft 20 so that the transmission gear 24 rotates the transmission drive shaft 20 when the add on gear 22 is rotated by the rotating counter drive shaft 16.

The transmission shaft 20 may be a flexible drive shaft commonly known as a flexible Bowden drive cable so that the transmission shaft 20 may be easily bent to fit inside exterior housing 18 of the magnetic tape cassette playing device 12 while still being rotated by the transmission gear 24.

The other end of the transmission shaft 20 extends through a hole in the exterior housing 18. A drive slot gear 26 is attached to this end of the transmission drive shaft 20 so that the drive slot gear 26 is rotated by the rotation of the transmission drive shaft. The drive slot gear 26 is rotatably mounted to a drive slot gear mounting bracket 28 which is attached to the exterior housing 18.

A timer 30 is removably mounted to the exterior housing 18 by detachable timer mounts 38 which may be magnets or some sort of adhesive tape. The timer 30 has a timing gear system 34 having an external timer gear 36 which engages the drive slot gear 26 so that the timing gear system 34 is rotated by the rotation of the drive slot gear 26. The timer 30 also has a time display mechanism 32 which is operatively coupled to the timing gear system 34 in such a way that the time display mechanism 32 is driven by the rotation of the timing gear system 34 to display the length of time a magnetic tape cassette has been played by the magnetic tape cassette playing device 12. Ideally, the timer 30 should be a thin profile device approximately the thickness of quarter so that it does not extend too far out from the exterior housing 18.

The preferred embodiment of the time display mechanism 32 comprises an analog clock timer 40 having a minutes hand 44, a seconds hand 46, a reset button 50, and a analog clock face 48. The analog clock face 48 includes a time start position 49 and has 60 minute increments on its so that the time may be easily read from the minute increments. The analog clock face 48 may also be numerically labeled in five or fifteen minute intervals for easier reading.

The minutes hand 44 are operatively connected to the timing gear system 34 so that the minutes hand 44 is rotated by the rotation of the timing gear system 34 to display on the analog clock face 48 the length of time in minutes the magnetic tape cassette has been playing. The said seconds hand 46 is operatively connected to the timing gear system 34 so that the seconds hand 46 is rotated by the rotation of the timing gear system 34 to display on the analog clock face 48 the length of time in seconds the magnetic tape cassette has been playing.

The reset button 50 is operatively coupled to the minutes hand 44 and to the seconds hand 46 so that depressing said reset button 50 similarly orientates said minutes hand 44 and said seconds hand 46 to said time start position on the analog clock face 48.

Optionally, instead of an analog clock timer 40, the time display mechanism 32 may be a digital timer (not shown). The digital timer would have a digital chronographic display such as a back lighted liquid crystal display which discloses the length of time in minutes and seconds the magnetic tape cassette has been playing.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A Clock Style Counter Attachment for a magnetic tape cassette playing device having an exterior housing and having an incremental tape position counter being driven by a rotating counter drive shaft from said magnetic tape cassette playing device playing a magnetic tape cassette, said Clock Style Counter Attachment comprising:

(a) an add on gear being disposed around said rotating counter drive shaft;

(b) a transmission drive shaft having a first end and a second end;

(c) a transmission gear being coupled to said first end of said transmission drive shaft, said transmission gear engaging said add on gear thereby rotating said transmission drive shaft;

(d) a drive slot gear being coupled to said second end of said transmission drive shaft wherein said drive slot gear being rotated by the rotation of said transmission drive shaft; and (e) a timer having a time display mechanism and a timing gear system, said timing gear system having an external timer gear, said external timer gear engaging said drive slot gear whereby said timing gear system being rotated by the rotation of said drive slot gear, said time display mechanism being operatively coupled to said timing gear system whereby said time display mechanism being driven by the rotation of said timing gear system whereby said time display mechanism displays the length of time said magnetic tape cassette has been played by said magnetic tape cassette playing device.

2. The Clock Style Counter Attachment of claim 1, wherein said second end of said transmission shaft being extended through said exterior housing of said magnetic tape cassette recording device, said drive slot gear being mounted to said exterior housing, and said timer removably attached to said exterior housing.

3. The Clock Style Counter Attachment of claim 1, wherein said time display mechanism comprises an analog clock timer having a minutes hand, a seconds hand, a reset button, and a analog clock face, said analog clock face including a time start position, said minutes hand being operatively connected to said timing gear system whereby said minute hand being rotated by the rotation of said timing gear system, and said seconds hand being operatively connected to said timing gear system whereby said seconds hand being rotated by the rotation of said timing gear system, said reset button being operatively coupled to said minutes hand and being operatively connected to said seconds hand whereby depressing said reset button similarly orientates said minutes hand and said seconds hand to said time start position.

4. The Clock Style Counter Attachment of claim 1, wherein said time display mechanism comprises a digital timer.

5. The Clock Style Counter Attachment of claim 1, wherein said transmission shaft is flexible whereby said transmission shaft may be bent while still being rotated by said transmission gear.

6. A Clock Style Counter Attachment, for a magnetic tape cassette playing device having an exterior housing and having an incremental tape position counter driven by a rotating counter drive shaft from said magnetic tape cassette playing device playing a magnetic tape cassette, said Clock Style Counter Attachment comprising:

(a) an add on gear being disposed around said counter drive shaft;

(b) a transmission drive shaft having a first end and a second end, said transmission shaft being flexible whereby said transmission shaft may be bent while still being rotated by said transmission gear;

(c) a transmission gear being coupled to said first end of said transmission drive shaft, said transmission gear engaging said add on gear thereby rotating said transmission drive shaft;

(d) a drive slot gear being coupled to said second end of said transmission drive shaft wherein said drive slot gear being rotated by the rotation of said transmission drive shaft;

(e) a drive slot gear mounting bracket being coupled to said exterior housing of said magnetic tape cassette playing device, said second end of said transmission shaft being extended through said exterior housing of said magnetic tape cassette recording device, and said drive slot gear being rotatably mounted to said drive slot gear; and (f) a timer having a time display mechanism and a timing gear system, said timer removably attached to said exterior housing, said timing gear system having an external timer gear, said external timer gear engaging said drive slot gear whereby said timing gear system being rotated by the rotation of said drive slot gear, said time display mechanism being operatively coupled to said timing gear system whereby said time display mechanism being driven by the rotation of said timing gear system whereby said time display mechanism displays the length of time said magnetic tape cassette has been played by said magnetic tape cassette playing device.

7. The Clock Style Counter Attachment of claim 6, wherein said time display mechanism comprises an analog clock timer having a minutes hand, a seconds hand, a reset button, and a analog clock face, said analog clock face including a time start position, said minutes hand being operatively connected to said timing gear system whereby said minute hand being rotated by the rotation of said timing gear system, and said seconds hand being operatively connected to said timing gear system whereby said seconds hand being rotated by the rotation of said timing gear system, said reset button being operatively coupled to said minutes hand and being operatively connected to said seconds hand whereby depressing said reset button similarly orientates said minutes hand and said seconds hand to said time start position.

8. The Clock Style Counter Attachment of claim 6, wherein said time display mechanism comprises a digital timer.

* * * * *